(12) United States Patent
Moore et al.

(10) Patent No.: US 8,439,336 B2
(45) Date of Patent: May 14, 2013

(54) DUAL PATH HYDRAULIC STRUT MOUNTS AND VEHICULAR SUSPENSION SYSTEMS INCLUDING THE SAME

(75) Inventors: Joseph K. Moore, Whitby (CA); Wojciech E. Suchta, Richmond Hill (CA); Kenneth L. Oblizajek, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 12/873,970

(22) Filed: Sep. 1, 2010

(65) Prior Publication Data

US 2012/0049428 A1  Mar. 1, 2012

(51) Int. Cl.
*B60G 13/00* (2006.01)

(52) U.S. Cl.
USPC .............. 267/220; 267/140.13; 280/124.155

(58) Field of Classification Search ........... 280/124.155, 280/124.157, 124.16, 124.147; 267/140.12, 267/140.13, 220, 35; 188/321.11
See application file for complete search history.

(56) References Cited

U.S. PATENT DOCUMENTS

| 5,131,638 | A | * | 7/1992 | Hein et al. ................... 267/220 |
| 5,232,209 | A | * | 8/1993 | de Fontenay ................. 267/220 |
| 5,595,374 | A | * | 1/1997 | Charette et al. ............... 267/220 |
| 6,427,814 | B1 | * | 8/2002 | Miyamoto ............... 188/321.11 |

FOREIGN PATENT DOCUMENTS

FR  2671839 A1 * 7/1992

* cited by examiner

*Primary Examiner* — Robert A Siconolfi
*Assistant Examiner* — Stephen Bowes
(74) *Attorney, Agent, or Firm* — Ingrassia Fisher & Lorenz, P.C.

(57) ABSTRACT

Embodiments of a dual path hydraulic strut mount are provided, as are embodiments of a vehicular suspension system including a dual path hydraulic strut mount. In one embodiment, the dual path hydraulic strut mount includes an outer elastomeric module and an inner hydraulic module, which is mounted in the outer elastomeric module. The inner hydraulic module is configured to operate in an active damping mode for axial displacements of the dual path hydraulic strut mount less than a threshold value and in a substantially inactive damping mode for axial displacements of the dual path hydraulic strut mount greater than the threshold value.

19 Claims, 6 Drawing Sheets

DUAL PATH HYDRAULIC STRUT MOUNTS AND VEHICULAR SUSPENSION SYSTEMS INCLUDING THE SAME

TECHNICAL FIELD

The following disclosure relates generally to vehicular suspension systems and, more particularly, to embodiments of a dual path hydraulic strut mount for deployment within a vehicular suspension system.

BACKGROUND

Vehicular strut assemblies have been extensively engineered to optimize vehicle handling (e.g., to continually maintain frictional contact between the vehicle's wheels and the road), while also isolating the vehicle body from vibratory forces produced when the vehicle travels over an uneven road surface. Despite this, a condition known as Smooth Road Shake ("SRS") can occur when a vehicle travels over a relatively smooth road and minor imperfections in the road surface and/or tire-wheel assemblies create relatively low amplitude disturbances, which are transmitted through the vehicle's strut assemblies to the vehicle body. While typically effective at attenuating higher amplitude vibratory forces produced when a vehicle travels over a relatively rough road, the components (e.g., hydraulic shock absorbers) included within conventional strut assemblies can completely, intermittently, or partially seize (i.e., become locked in place) due to stiction and friction forces when subjected to the relatively low amplitude vibratory forces characteristic of SRS; e.g., in the case of vertical SRS, specifically, vertical displacements equal to or less than approximately 1-4 millimeters (mm). As a result, conventional strut assemblies are often ineffective at isolating a vehicle from the vibratory forces produced during an SRS event. Although an elastomeric strut mount (e.g., a rubber pad within a metal ring) can be disposed between the upper end of each strut assembly and the vehicle body to reduce the transmission of higher amplitude vibratory forces, conventional elastomeric mounts typically have relatively high axial stiffnesses with low damping and consequently provide little additional attenuation of the low amplitude vibratory forces associated with SRS.

There thus exists an ongoing need to provide embodiments of a strut mount suitable for use in conjunction with a vehicular strut assembly that is relatively effective at attenuating relatively minor vertical displacements (e.g., displacements less than approximately 1-4 mm). It is also desirable for embodiments of such a strut mount to have a higher, progressive axial stiffness for larger vertical displacements (e.g., displacements exceeding approximately 1-4 mm) and to have a relatively high radial stiffness to impart optimal ride and handling characteristics to a vehicle when operating under higher dynamic loads. It would further be desirable for embodiments of such a strut mount to be durable and readily amenable to manufacture. Other desirable features and profiles of the present invention will become apparent from the subsequent Detailed Description and the appended Claims, taken in conjunction with the accompanying Drawings and this Background.

BRIEF SUMMARY

Embodiments of a dual path hydraulic strut mount are provided. In one embodiment, the dual path hydraulic strut mount includes an outer elastomeric module and an inner hydraulic module, which is mounted in the outer elastomeric module. The inner hydraulic module is configured to operate in an active damping mode for axial displacements of the dual path hydraulic strut mount less than a threshold value and in a substantially inactive damping mode for axial displacements of the dual path hydraulic strut mount greater than the threshold value.

Embodiments of a vehicular suspension system are also provided. In one embodiment, the vehicular suspension system includes a strut assembly and a dual path hydraulic strut mount. The dual path hydraulic strut mount includes an outer elastomeric module configured to be mounted to the vehicle body, and an inner hydraulic module mounted in the outer elastomeric module and coupled to the strut assembly. The inner hydraulic module is configured to operate in an active damping mode for axial displacements of the dual path hydraulic strut mount less than a threshold value and in a substantially inactive damping mode for axial displacements of the dual path hydraulic strut mount greater than the threshold value.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. As appearing herein, the term "strut," the phrase "strut assembly," and like terms and phrases are utilized broadly to encompass a structural element or assemblage of structural elements that isolates a vehicle or other host object from vibratory input forces. Although described below in conjunction with an exemplary vehicular suspension system including a particular type of strut assembly, it is emphasized that embodiments of the dual path hydraulic strut mount can be utilized within a wide variety of vehicular suspension systems including various other strut assemblies, such as double wishbone suspension assemblies, and damping elements.

Figure 1:
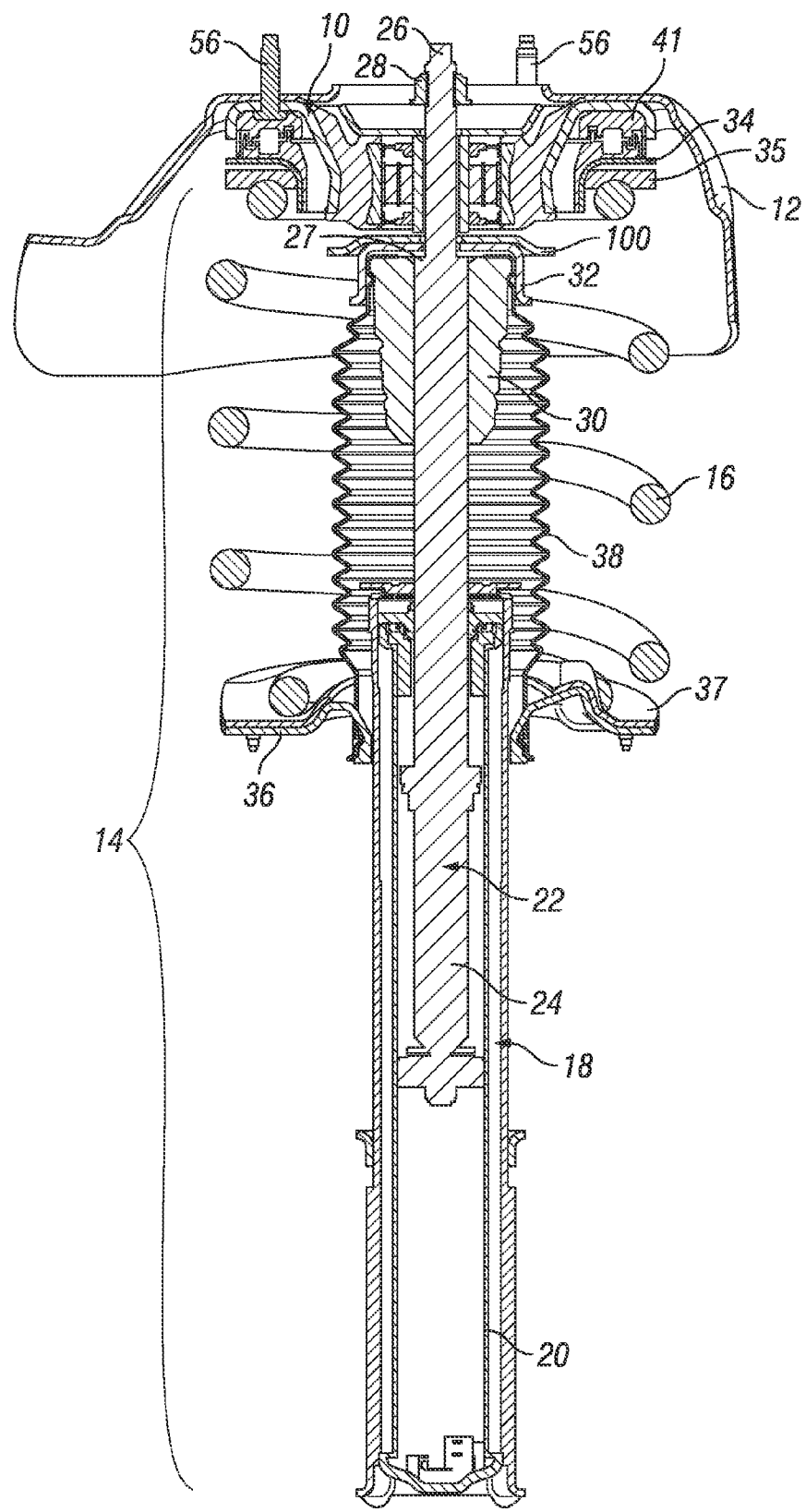
FIG. 1 is a cross-sectional view of a vehicular suspension system including a dual path hydraulic strut mount mounted between a strut assembly and a vehicle body (partially shown) in accordance with an exemplary embodiment.

FIG. 1 is a cross-sectional view of a vehicular suspension system including a dual path hydraulic strut mount 10 mounted between a vehicle body 12 (partially shown) and a strut assembly 14. In this particular example, strut assembly 14 assumes the form of a MacPherson-style strut including a coil spring 16 disposed around a shock absorber 18. Shock absorber 18 includes a main cylinder 20 and a piston rod 22 having a lower end portion 24, which is slidably mounted within the bore of cylinder 20; and an upper end portion 26, which extends upwardly from cylinder 20, through coil spring 16, and through a central opening provided in strut mount 10. At its terminal end, upper end portion 26 of piston rod 22 is secured to strut mount 10 by a retaining nut 28. A bumpstop 30 is disposed around an intermediate portion of piston rod 22 and abuts an annular cap member 32, which, in turn, abuts a lower component included within hydraulic strut mount 10 (i.e., travel limiter 100, described below). An upper spring isolator 35 (e.g., a partially-contacting annular isolating rubber element) is disposed around a lower portion of hydraulic strut mount 10, trapped between the upper winding of spring 16 and an upper spring seat 34. A lower spring seat isolator 37 (e.g., a partially-contacting annular isolating rubber element) is likewise trapped between the lower winding of spring 16 and a lower spring seat 36. A bellows 38 (also commonly referred to as a "dust cover" or a "strut boot") is disposed over the upper end portion of shock absorber 18 between annular cap member 32 and lower spring seat 36 to prevent the ingress of dust and other debris into cylinder 20. Finally, an annular bearing structure 41 engages the underside of a component included within strut mount 10 (e.g., outer insert 48, described below) to allow upper spring seat 34 (FIG. 1), and therefore the upper end of coil spring 16 (FIG. 1), to rotate relative to strut mount 10 and vehicle body 12 during operation of strut assembly 14.

Coil spring 16 is compressed between upper spring seat 34 and lower spring seat 36. When a vehicle equipped with strut assembly 14 travels over an uneven road surface, coil spring 16 further dynamically compresses or extends to provide relatively compliant axial movement, which is then damped by shock absorber 18 in the well-known manner. However, as explained in the foregoing section entitled "Background," stiction and friction forces can cause shock absorber 18 to partially or intermittently seize (i.e., become locked in place) when the vehicle travels over a relatively smooth road and minor imperfections in the road and/or wheel imbalances create relatively low amplitude disturbances that are transmitted through strut assembly 14 and to the vehicle body (a condition commonly referred to as "Smooth Road Shake" or, more simply, "SRS"). When coupled in series with strut assembly 14, dual path hydraulic strut mount 10 effectively reduces the transmission of low amplitude vibratory forces to the vehicle body by providing adequate axial damping for smaller vertical displacements characteristic of SRS (e.g., vertical inputs equal to or less than approximately 1-4 mm). At the same time, hydraulic strut mount 10 provides a progressive axial stiffness for larger vertical displacements (e.g., vertical displacements exceeding approximately 1-4 mm). As the strut mount 10 stiffens under these larger displacements, damping is reduced in strut mount 10, and the axial damping is then provided by shock absorber 18, since the forces are now sufficient to overcome the stiction and friction interferences typical of shock absorber 18. Under these larger displacements, reliance on shock absorber 18 for damping while providing a relatively high radial stiffness imparts optimal ride and handling characteristics under the greater dynamic loads. The manner in which dual path hydraulic strut mount 10 provides such a unique, dynamic multi-stage axial-load characteristic is described below in conjunction with FIG. 7.

Figure 2:
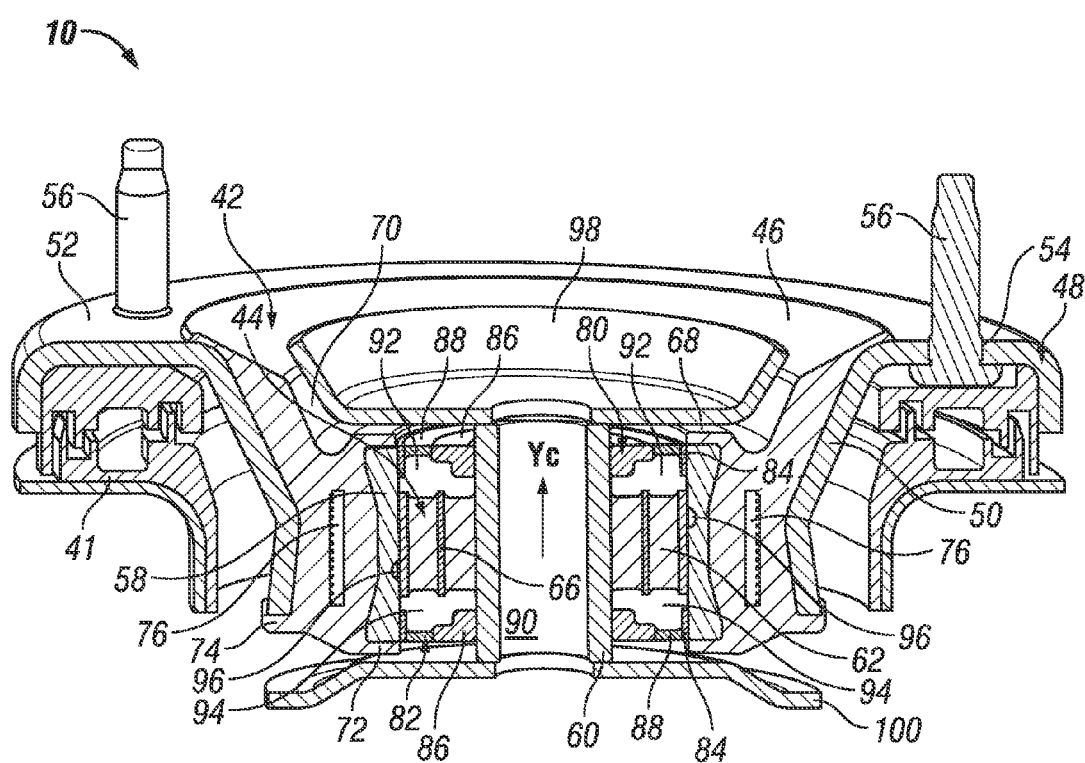
FIGS. 2 and 3 are assembled and exploded cross-sectional views, respectively, of the exemplary dual path hydraulic strut mount shown in FIG. 1.
Figure 3:
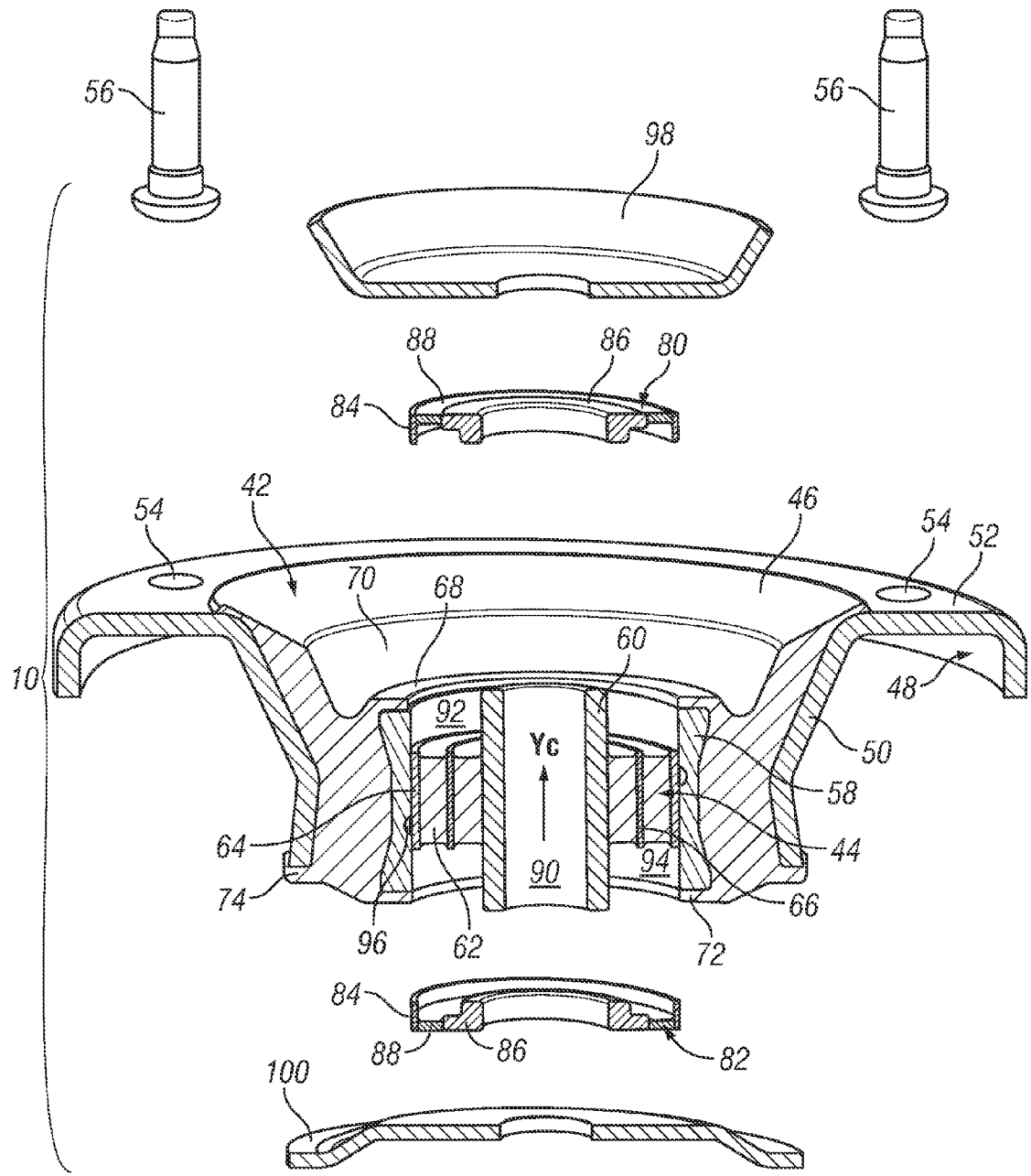

FIGS. 2 and 3 are assembled and exploded cross-sectional views, respectively, illustrating dual path hydraulic strut mount 10 in greater detail. Strut mount 10 includes two main functional modules, namely, an outer elastomeric module 42 and an inner hydraulic module 44. Outer elastomeric module 42 includes a main elastomeric element 46, an inner support structure or intermediate insert 58, and an outer support structure or insert 48 having an annular body 50 and a radial mounting flange 52. Main elastomeric element 46 is disposed between outer insert 48 and intermediate insert 58. As shown in FIGS. 2 and 3, an intermediate section of annular body 50 may taper radially inward and retain main elastomeric element 46 within outer insert 48. Main elastomeric element 46 is conveniently formed from a durable elastomer, such as a relatively dense rubber; and outer insert 48 and intermediate insert 58 are conveniently formed from a relatively rigid material, such as a plastic, metal, or alloy. In one embodiment, outer insert 48 is stamped from a metal or alloy sheet, intermediate insert 58 is cast from a metal or alloy, and main elastomeric element 46 is molded to bodies 48 and 58. Outer flange 52 is conveniently manufactured to include a plurality of circumferentially-spaced openings 54 to facilitate attachment of outer insert 48 to vehicle body 12 (FIG. 1) utilizing, for example, a plurality of studs 56 or other such fasteners.

Inner hydraulic module 44 includes an outer ring insert 64, an elastomeric bushing 62, and an inner cylinder 60. In the illustrated example, outer ring insert 64 assumes the form of a rigid, tubular body disposed within (e.g., press-fit into) a central opening provided through intermediate insert 58; and elastomeric bushing 62 assumes the form of a flexible, annular body (e.g., a durable elastomer) molded to outer ring insert 64 and inner cylinder 60. Elastomeric bushing 62 extends radially inward from outer ring insert 64 to a mid-section of inner cylinder 60. In so doing, elastomeric bushing 62 partitions upper and lower hydraulic chambers formed within inner hydraulic module 44 (i.e., hydraulic chambers 92 and 94), as described more fully below. Proceeding around the mount in an angular sense about axis Yc (the vertical axis of the mount), the axial length of elastomeric bushing 62 may vary, providing advantageous properties such as reduced axial stiffness and directional radial stiffness.

The main elastomeric element 46 (with intermediate insert 58 and outer insert 48), and elastomeric bushing 62 (with outer ring insert 64 and inner cylinder 60) may be manufactured as separate molded assemblies and then attached (e.g., press fit) together at the intermediate insert 58 to outer ring insert 64 interface. Alternately, the intermediate insert 58 and outer ring insert 64 may be attached (e.g., press fit) together prior to molding, and the main elastomeric element 46 and elastomeric bushing 62 along with associated inserts may be manufactured via a single rubber mold.

If desired, and as indicated in FIGS. 2 and 3 at 66, complete, interrupted, or multiple rigid annular bodies (commonly referred to as "rate plates") may be mounted through or embedded within elastomeric bushing 62 to increase the radial-to-axial rate ratio of elastomeric bushing 62 and, therefore, the radial-to-axial rate ratio of inner hydraulic module 44. If multiple rate plates are employed, angular positioning of the rate plates about axis Yc will provide directional radial stiffness, advantageous for certain vehicles, which opportunities and needs readily will be recognized by skilled practitioners in the field. Similarly, as shown only in FIG. 2, at least one annular outer rate plate 76 can be disposed within main elastomeric element 46 between intermediate insert 58 and outer insert 48 to increase the radial-to-axial rate ratio of main elastomeric element 46 and, therefore, the radial-to-axial rate ratio of outer elastomeric module 42. Similar to rate plates 66, outer rate plates 76 can be annularly continuous, interrupted, or comprising separate bodies strategically positioned about axis Yc in order to achieve advantageous directional radial stiffness properties.

Main elastomeric element 46 is formed to include a number of progressive loading features or bumpstops. More specifically, the upper portion of elastomeric element 46 is formed to include an upper primary bumpstop 68 and an upper secondary bumpstop 70; and the lower portion of elastomeric element 46 is formed to include a lower primary bumpstop 72 and a lower secondary bumpstop 74. Primary bumpstops 68 and 72 may assume any form suitable for selectively impeding the axial displacement of inner hydraulic module 44, and secondary bumpstops 70 and 74 may assume any form for limiting the axial deflection of outer elastomeric module 42, as described more fully below. In the illustrated example, upper primary bumpstop 68 and lower primary bumpstop 72 assume the form of first and second raised lips or rims, which are formed along upper and lower inner circumferential portions of main elastomeric element 46, respectively, and bonded to the upper and lower portions of intermediate insert 58, respectively. Lower secondary bumpstop 74 likewise assumes the form of a raised lip or rim, which extends around an outer circumferential portion of main elastomeric element 46 and bonded to the lower end of outer insert 48. Finally, upper secondary bumpstop 70 comprises the upper frustoconical section of elastomeric element 46, which extends around an interior portion of annular body 50. In a preferred embodiment, bumpstops 68, 70, 72, and 74 are integrally formed with main elastomeric element 46 as a single, molded piece. Although not shown in FIGS. 2 and 3 for clarity, bumpstops 68, 70, 72, and/or 74 may include castellations to reduce the production of noise when contacted and deflected by neighboring structural elements (i.e., travel limiters 98 and 100, described below) during operation of dual path hydraulic strut mount 10.

In addition to outer ring insert 64, elastomeric bushing 62, and inner cylinder 60, inner hydraulic module 44 further includes an upper diaphragm assembly 80, a lower diaphragm assembly 82, and hydraulic fluid (e.g. a glycol mixture) contained within chamber 92 and 94. Diaphragm assemblies 80 and 82 each include an outer mount ring 84, a piston 86, and a flexible membrane or diaphragm 88, which extends radially inward from outer mount ring 84 to piston 86 to form a disc-like body. Diaphragm assemblies 80 and 82 may be identical or unique molded assemblies. Pistons 86 of diaphragm assemblies 80 and 82 are fixedly coupled (e.g., press fit) around opposing end portions of inner cylinder 60, while outer mount rings 84 of diaphragm assemblies 80 and 82 are each fixedly coupled (e.g., press fit) within an inner circumferential surface of intermediate insert 58. When dual path hydraulic strut mount 10 is installed within a vehicle, inner cylinder 60 is attached to the upper end portion of piston rod 22 shown in FIG. 1; e.g., as indicated in FIGS. 2 and 3, a central channel or aperture 90 may be provided through inner cylinder 60 to accommodate the upper end portion of piston rod 22, which may be secured to inner cylinder 60 in the above-described manner (e.g., secured utilizing a threaded fastener, such as retaining nut 28 shown in FIG. 1, clamping the inner cylinder 60, travel limiter 98 and 100, and annular cap member 32 captured between the shoulder 27 of the upper end of piston rod 26 and nut 28). Inner cylinder 60 thus translates in conjunction with piston rod 22 (FIG. 1) during operation of hydraulic strut mount 10. As inner cylinder 60 translates within inner hydraulic module 44, diaphragms 88 flex to accommodate the relative axial movement between outer mount rings 84, and pistons 86. Elastomeric bushing 62 likewise flexes to accommodate relative translational movement between inner cylinder 60 and outer insert 64.

As stated above, an upper hydraulic chamber 92 and a lower hydraulic chamber 94 are formed within inner hydraulic module 44. Upper hydraulic chamber 92 is defined by the volume bounded by intermediate insert 58, inner cylinder 60, elastomeric bushing 62, and upper diaphragm assembly 80; and lower hydraulic chamber 94 is defined by the volume bounded by intermediate insert 58, inner cylinder 60, elastomeric bushing 62, and lower diaphragm assembly 82. As previously noted, hydraulic chambers 92 and 94 are partitioned by elastomeric bushing 62 and fluidly coupled by one or more flow passages or orifices. In the illustrated example, specifically, hydraulic chambers 92 and 94 are fluidly connected by a spiral-shaped inertia track 96 formed in an inner circumferential section of intermediate insert 58 and bounded by outer ring insert 64. During translational movement of inner hydraulic module 44, hydraulic fluid (shown in FIG. 2) is forced by pistons 86, through inertia track 96, and between chambers 92 and 94 resulting in damping. To optimize the damping characteristics of inner hydraulic module 44, the shape, length, and cross-sectional area of inertia track 96 are conveniently selected to tune fluid travel through inertia track 96 in a manner well-known to those skilled in the art of hydroelastic bushings and mounts. The foregoing notwithstanding, hydraulic chambers 92 and 94 can be fluidly coupled in various other manners, as well. For example, in certain embodiments, at least one orifice may be provided through elastomeric bushing 62 and/or through outer insert 64 to fluidly couple hydraulic chambers 92 and 94 and thereby provide damping via viscous losses during translational movement of hydraulic pistons 86 and the corresponding deflection of upper diaphragm assembly 80, lower diaphragm assembly 82, and elastomeric bushing 62. In still further embodiments, inner hydraulic module 44 may include an inertia track formed in a different component of module 44, such as in outer ring insert 64.

Although not shown in FIGS. 2 and 3 for clarity, inner hydraulic module 44 may include one or more pressure relief valves (also commonly referred to as "blow-off valves") fluidly coupled between hydraulic chambers 92 and 94. For example, elastomeric bushing 62 can be molded to include bypass flow passage and at least one flap-style valve feature that normally resides in a closed position to generally prevent fluid flow through the bypass flow passage. When the pressure within a hydraulic chamber (e.g., lower hydraulic chamber 94) surpasses a predetermined threshold due to an abrupt and significant vertical velocity of inner hydraulic module 44 (e.g., as may occur if the vehicle travels over a pothole), the flap-style valve feature opens to enable hydraulic fluid to flow from lower hydraulic chamber 94 to upper hydraulic chamber 92 while bypassing orifice or inertia track 96. In this manner, hydraulic fluid can be rapidly evacuated from hydraulic chamber 94 (or chamber 92) to prevent the internal pressure from becoming undesirably high thereby reducing the likelihood of hydraulic fluid leakage. In further embodiments, other types of pressure relief valves may be employed and disposed at other locations within inner hydraulic module 44; e.g., in a further implementation, a poppet-style pressure relief valve or other pressure relief valve may be mounted within a wedge-shaped void provided through outer ring insert 64.

With continued reference to FIGS. 2 and 3, hydraulic strut mount 10 further includes an upper travel limiter 98 (also referred to as a "rebound travel limiter") and a lower travel limiter 100. In the illustrated example, upper travel limiter 98 assumes the form of a first cup-shaped washer, which is fixedly mounted to an upper end of inner cylinder 60 extending upwardly from inner hydraulic module 44. Lower travel limiter 100 likewise assumes the form of a second cup-shaped washer, which is fixedly mounted to the lower end of inner cylinder 60 extending from the lower face of inner hydraulic module 44. During operation of dual path hydraulic strut mount 10, upper travel limiter 98 cooperates with upper primary bumpstop 68 and upper secondary bumpstop 70 to limit the downward axial deflection of inner hydraulic module 44 and outer elastomeric module 42, respectively. Similarly, lower travel limiter 100 cooperates with lower primary bumpstop 72 and lower secondary bumpstop 74 to limit the upward axial deflection of inner hydraulic module 44 and outer elastomeric module 42, respectively. The manner in which lower travel limiter 100 cooperates with lower bumpstops 72 and 74 to limit the upward axial deflection of modules 42 and 44 is described more fully below in conjunction with FIGS. 4-7, and the manner in which upper travel limiter 98 cooperates with upper bumpstops 68 and 70 to limit the downward axial deflection of modules 42 and 44 is described below in conjunction with FIG. 8.

Figure 4:
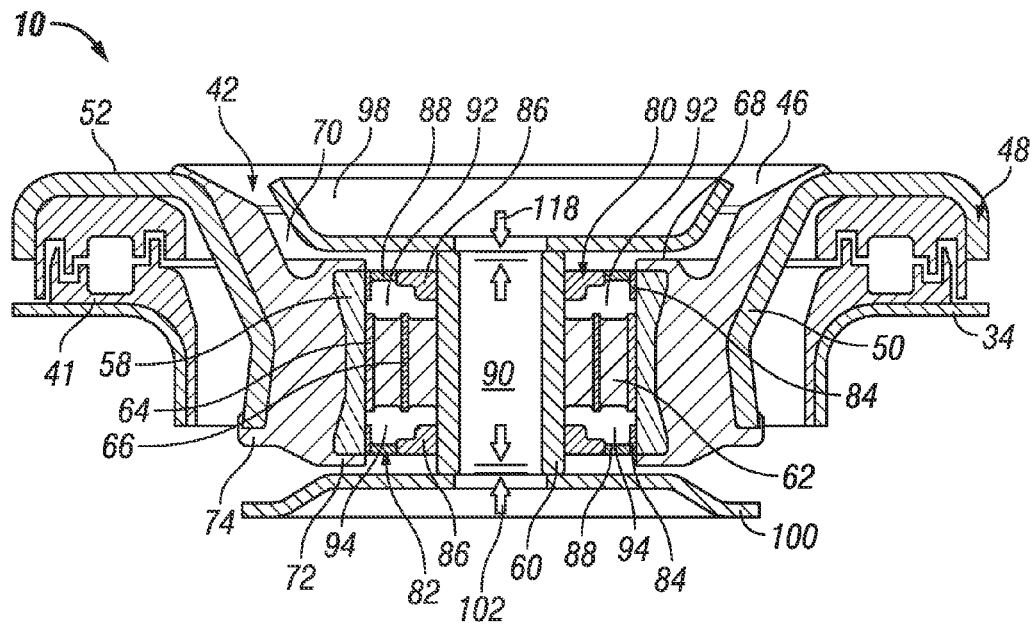
FIGS. 4, 5, and 6 are cross-sectional views of the dual path hydraulic strut mount in a normal or design position, in a first upwardly deflected position, and in a second upwardly deflected position, respectively.

FIG. 4 is a cross-sectional view of dual path hydraulic strut mount 10 in a normal or design position. If desired, main elastomeric element 46 and elastomeric bushing 62 can be molded to have a vertical bias to offset static preload effects due to pressure within the hydraulic damper 18. In this way, the normal or design position is achieved when installed on the vehicle. The vertical bias is preferentially applied to inner bushing 62 due to its comparatively low axial stiffness. Similarly, upper diaphragm assembly 80 and lower diaphragm assembly 82 can be biased in the as-assembled state, such that when installed on the vehicle, the design position is achieved. As a point of emphasis, hydraulic strut mount 10 is designed such that inner hydraulic module 44 provides damping for axial displacements of hydraulic strut mount 10 less than a predetermined threshold value and becomes relatively hydraulically inactive for axial displacements of hydraulic strut mount 10 exceeding the predetermined threshold value. When considering the upward deflection or displacement of hydraulic strut mount 10, the predetermined threshold value is generally determined by the width of the axial gap separating the upper surface of lower travel limiter 100 from lower primary bumpstop 72 when hydraulic strut mount 10 is in the design position (identified in FIG. 4 by arrows 102). As will be described more fully below, inner hydraulic module 44 provides a relatively soft on-center elastic rate well-suited for enabling significant damping at the low level amplitude vibrations associated with SRS. Thus, by selecting the width of the axial gap separating lower travel limiter 100 from lower primary bumpstop 72 in the design position to generally correspond to the amplitude of vibratory inputs characteristic of SRS, hydraulic strut mount 10 can be designed to effectively reduce the transmission of low amplitude vibratory forces to the vehicle body during an SRS event. As a non-limiting example, the width of the axial gap separating lower travel limiter 100 from lower primary bumpstop 72 when hydraulic strut mount 10 is in the design position, and therefore the predetermined the threshold value, is preferably selected to be between approximately 1 mm to approximately 4 mm and, more preferably, between approximately 1.5 mm and approximately 2.5 mm. In the illustrated example, specifically, the width of the axial gap separating lower travel limiter 100 from lower primary bumpstop 72 in the design position is approximately 2 mm.

Figure 5:
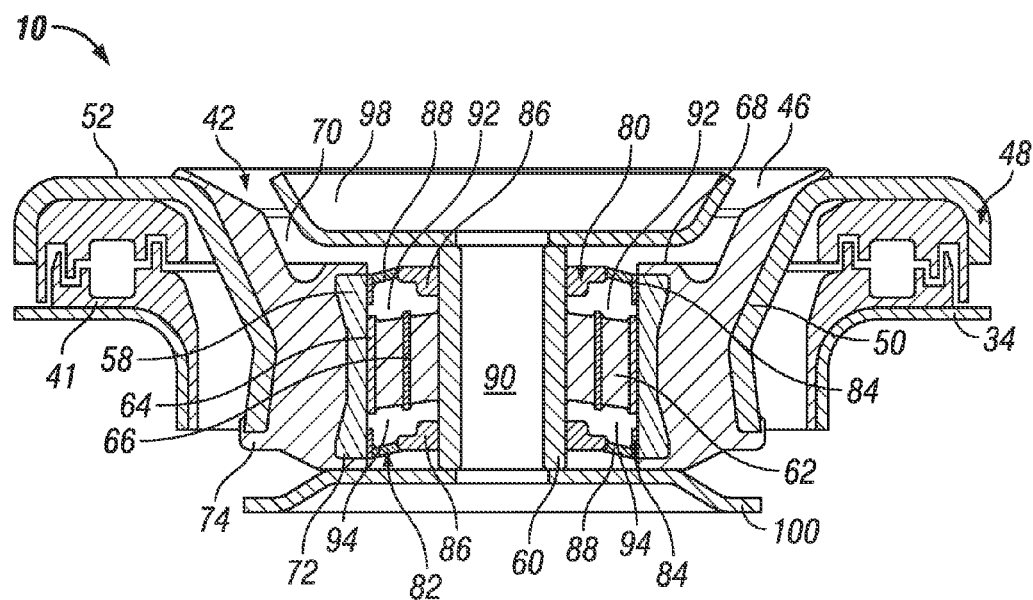

FIG. 5 is a cross-sectional view of dual path hydraulic strut mount 10 after upward displacement of hydraulic strut mount 10 and, specifically, upward displacement of inner hydraulic module 44 substantially equivalent to the threshold value (e.g., 2 mm). As can be seen in FIG. 5, inner cylinder 60, upper travel limiter 98, and lower travel limiter 100 have moved upward relative to outer module 42, and lower travel limiter 100 now engages lower primary bumpstop 72. As noted above, the axial stiffness of inner hydraulic module 44 is considerably less than the axial stiffness of outer elastomeric module 42. As a result, inner hydraulic module 44 undergoes a relatively large axial displacement, while outer elastomeric module 42 experiences little to no axial deflection when hydraulic strut mount 10 transitions from the design position (FIG. 4) to the partially deflected position shown in FIG. 5. Notably, engagement of lower travel limiter 100 and lower primary bumpstop 72 generally prevents further upward travel of inner cylinder 60. In so doing, lower travel limiter 100 and lower primary bumpstop 72 render inner hydraulic module 44 substantially inactive for further upward displacements of dual path hydraulic strut mount 10. Furthermore, by limiting the relative axial movement of inner cylinder 60 and intermediate insert 58 to a sub-set of the full displacement range of hydraulic strut mount 10 in this manner, mechanical strain placed on inner hydraulic module 44 (and, specifically, on elastomeric bushing 62 and diaphragm assemblies 80 and 82) is reduced, the durability of inner hydraulic module 44 is increased, and the likelihood of hydraulic fluid leakage is minimized.

Figure 6:
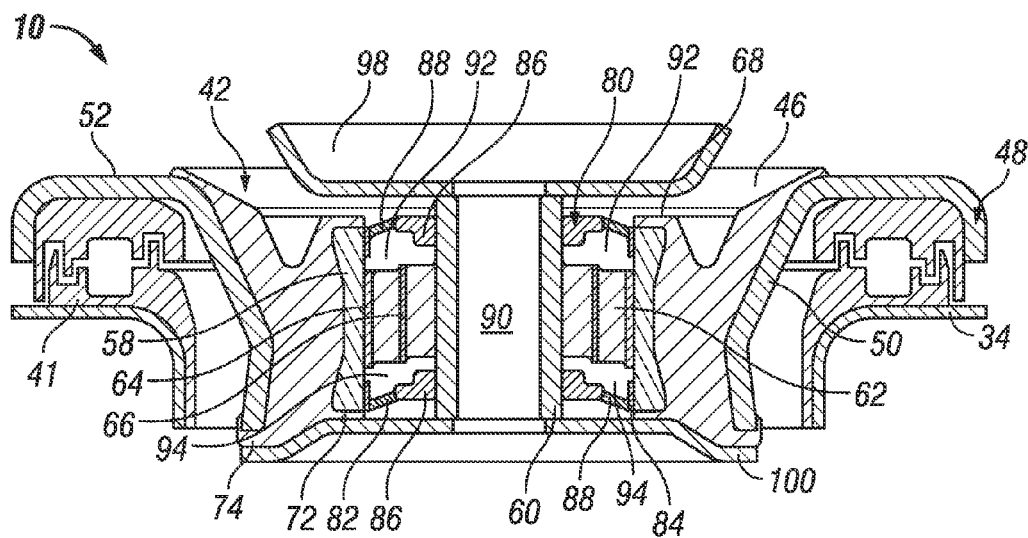

FIG. 6 is a cross-sectional view of dual path hydraulic strut mount 10 after further upward deflection of strut mount 10 and, specifically, upward deflection of outer elastomeric module 42. As previously stated, lower travel limiter 100 engages lower primary bumpstop 72 when hydraulic strut mount 10 transitions from the design position (FIG. 4) into the partial upwardly deflected position shown in FIG. 5. Thus, from the partial upwardly deflected position shown in FIG. 5, further upward movement of inner cylinder 60 (or, more accurately, further upward translational movement of inner cylinder 60 relative to intermediate insert 58) is generally prevented by the engagement of lower travel limiter 100 and lower primary bumpstop 72. Main elastomeric element 46 of outer elastomeric module 42 is consequently required to deflect to permit further upward axial displacement of hydraulic strut mount 10 beyond the threshold value (e.g., 2 mm). Thus, when transitioning from the upwardly deflected position shown in FIG. 5 to the upwardly deflected position shown in FIG. 6, the axial displacement of hydraulic strut mount 10 occurs primarily within outer elastomeric module 42. As a result, the axial stiffness of outer elastomeric module 42 is predominately determinative of the total axial stiffness of dual path hydraulic strut mount 10 for axial displacements of hydraulic strut mount 10 exceeding the predetermined threshold value (e.g., 2 mm). In this manner, outer elastomeric module 42 and inner hydraulic module 44 cooperate during operation of dual path hydraulic strut mount 10 to impart hydraulic strut mount 10 with a unique, axial-load deflection profile, as described more fully below in conjunction with FIG. 7.

Figure 7:
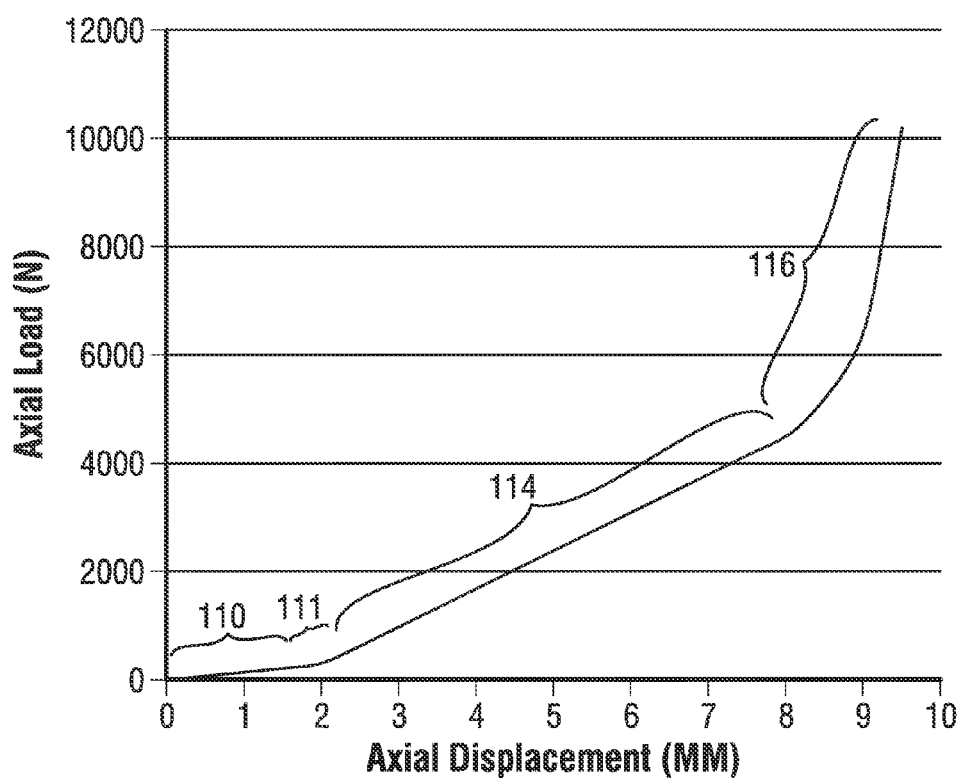
FIG. 7 is a graph of axial displacement (horizontal axis) versus load (vertical axis) illustrating an exemplary axial load-displacement profile of the dual path hydraulic strut mount shown in FIGS. 1-6.

FIG. 7 is a graph of quasi-static strut mount deflection (horizontal axis) versus load (vertical axis) illustrating an exemplary axial load-displacement profile representative of dual path hydraulic strut mount 10. The values shown FIG. 7 and described below are provided by way of example only and will inevitably vary amongst different embodiments. As can be seen in FIG. 7, the static axial load-displacement profile of dual path hydraulic strut mount 10 is generally characterized over a predetermined axial displacement range by a piecewise function and, more specifically, by a four stage, piecewise function.

In the illustrated example, the first stage of the piecewise function (represented in FIG. 7 by a first substantially linear segment 110) ranges from 0 mm to approximately 2 mm (the threshold value) and corresponds to upward axial displacement of hydraulic strut mount 10 from the design position (FIG. 4) to the partial upward deflected position (FIG. 5). As explained above, due to the relatively low axial stiffness of inner hydraulic module 44, axial displacement of inner hydraulic module 44 constitutes most of the total axial displacement of hydraulic strut mount 10 over this initial range of axial displacement (inner hydraulic module 44 and outer elastomeric module 42 function essentially as two impedances in series; and, under quasi-static conditions, as two springs in series). The axial stiffness of inner hydraulic module 44 is thus primarily determinative of segment 110 and can be tuned, as appropriate, to enable attenuation of the low amplitude vibrations characteristic of SRS through damping action of the hydraulic mount. At the same time, the radial-to-axial rate ratio of inner hydraulic module 44 can be chosen to be relatively high to provide desired vehicular ride and handling characteristics for axial displacements of hydraulic strut mount 10 less than the threshold value (e.g., 2 mm). As a non-limiting example, the combined effect of the inner hydraulic module 44 and outer elastomeric module 42 may provide a vertical rate of approximately 150 Newton per mm (N/mm), a radial rate of approximately 1,500 N/mm, and therefore a radial-to-axial rate ratio of approximately 10:1 for axial displacements of hydraulic strut mount 10 less than the threshold value (e.g., 2 mm).

The second stage of the piecewise function (represented in FIG. 7 by a second segment 111) represents the non-linear rate transition region that occurs as a result of the initial contact of lower travel limiter 100 and lower primary bumpstop 72 and the initial compression of bumpstop 72. In the exemplary embodiment, the quasi-static axial stiffness is characterized by the parallel spring contribution of the shear stiffness of elastomeric bushing 62 and the compression stiffness of lower primary bumpstop 72, which then is combined in series with the shear stiffness of elastomeric element 46. This second stage ranges from approximately 2 mm (the threshold value) to approximately 2.5 mm. Segment 111 thus graphically expresses this non-linear rate transition region.

As identified in FIG. 7 by line segment 114, the third stage of the four-stage, piecewise profile ranges from approximately 2.5 mm to approximately 8 mm and corresponds to upward axial displacement of hydraulic strut mount 10 from the upwardly deflected position shown in FIG. 5 to the upwardly deflected position shown in FIG. 6. During the third stage of the piecewise profile, the incremental axial displacement of hydraulic strut mount 10 is substantially due to deflection of outer elastomeric module 42 (with a small contribution from the incremental displacement in lower primary bumpstop 72 and elastomeric bushing 62). As a result, the axial stiffness of outer elastomeric module 42 is predominately determinative of segment 114. Outer elastomeric module 42 can thus be designed to provide a progressive axial stiffness and a radial-to-axial rate ratio to impart the vehicle with desired ride and handling characteristics under higher dynamic loads for axial displacements exceeding a determined value (e.g., 2.5 mm). As a non-limiting example, inner hydraulic module 44 and outer elastomeric module 42 may be designed to provide a vertical rate of approximately 700 Newton per mm, a radial rate of approximately 2,000 N/mm, and therefore a radial-to-axial rate ratio of approximately 3:1 for axial displacements of hydraulic strut mount 10 greater than a determined value (e.g., 2.5 mm). As previously stated, the axial stiffness of outer elastomeric module 42 is greater than the axial stiffness of inner hydraulic module 44; thus, the force-deflection gradients of segment 114 are greater than the force-deflection gradients of segment 110.

The fourth and final stage of the piecewise function (represented in FIG. 7 by a fourth segment 116) represents the non-linear rate transition region that occurs after lower travel limiter 100 engages lower secondary bumpstop 74 when dual path hydraulic strut mount 10 transitions beyond the upwardly deflected position shown in FIG. 6. In the illustrated example, lower travel limiter 100 contacts lower secondary bumpstop 74 after hydraulic strut mount 10 undergoes an axial displacement of approximately 8 mm. Due to engagement of lower travel limiter 100 and lower secondary bumpstop 74, significantly greater axial loads are required to cause further upward axial displacement of hydraulic strut mount 10. Segment 116 thus graphically expresses the non-linear rate progression required to further deflect hydraulic strut mount 10 after engagement of lower travel limiter 100 and lower secondary bumpstop 74.

The foregoing has thus provided an exemplary embodiment of a dual path hydraulic strut mount suitable for use in conjunction with a vehicular strut assembly that is effective at attenuating low amplitude vibratory forces associated with SRS. In the above-described exemplary embodiment, the hydraulic strut mount provided a relatively soft quasi-static on-center axial elastic rate for vertical displacements less than a predetermined threshold value (e.g., displacements equal to or less than approximately 1-4 mm), while also providing a progressive axial stiffness for vertical displacements exceeding the threshold value. During the zone of relatively high quasi-static compliance, damping is provided through the action of displacing fluid within the top mount, otherwise unavailable from the shock which is partially, intermittently or completely seized under these small relative displacements. In addition, the above-described strut mount provided a relatively high radial stiffness to impart desirable ride and handling profile to a vehicle operating under higher cornering or steering dynamic loads. Furthermore, due, at least in part, to the limited operational range of the inner hydraulic module, the above-described exemplary strut mount was relatively durable and desensitized to hydraulic fluid leakage. As a still further advantage, the above-described exemplary strut mount is amenable to manufacture utilizing conventional fabrication processes.

Figure 8:
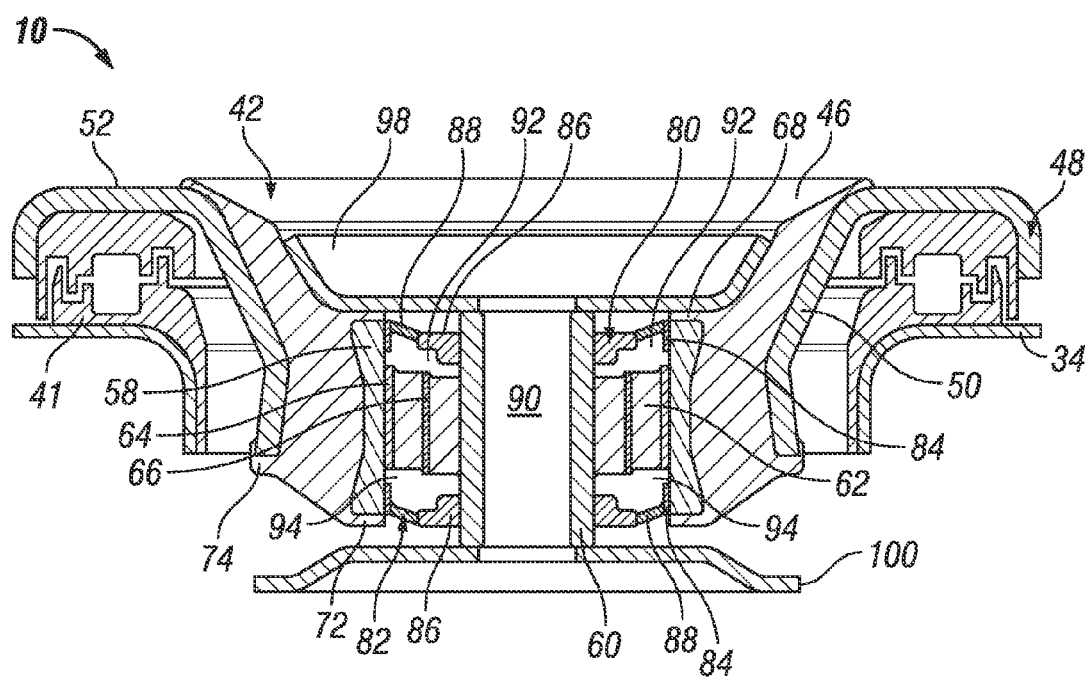
FIG. 8 is a cross-sectional view of the dual path hydraulic strut mount in a downwardly deflected position.

While the foregoing described an exemplary axial load-displacement profile in conjunction with the upward vertical displacement of dual path hydraulic strut mount 10, it will be appreciated that the downward vertical displacement of hydraulic strut mount 10 is also characterized by a similar multistage, piecewise axial load-displacement profile. Further emphasizing this point, FIG. 8 illustrates dual path hydraulic strut mount 10 after full downward deflection; e.g., after a downward axial displacement of, for example, approximately 7 mm. As was the case previously with lower travel limiter 100 and lower primary bumpstop 72, an axial gap separates upper travel limiter 98 and upper primary bumpstop 68 (represented in FIG. 4 by arrows 118). As inner cylinder 60 moves axially downward over a first range of travel (e.g., due to rebound after initial upward displacement of hydraulic strut mount 10), upper travel limiter 98 moves toward and ultimately contacts upper primary bumpstop 68. Over this range of motion, inner hydraulic module 44 operates in an active mode and largely determines the axial load-displacement characteristic of hydraulic strut mount 10. Again, this range of motion may be 0 to approximately 2 mm and is graphically represented by segment 110 shown in FIG. 7. After upper travel limiter 98 engages upper primary bumpstop 68, inner hydraulic module 44 is effectively deactivated, and deflection of outer elastomeric module 42 is required to permit additional axial displacement of hydraulic strut mount 10. A short non-linear transition region is characterized by the initial deflection of the primary bumpstop 68 (second stage of the piece-wise profile represented by segment 111 in FIG. 7). Over the third stage of the piece-wise profile (represented by segment 114 in FIG. 7), the axial stiffness of outer elastomeric module 42 is predominately determinative of the axial load-displacement characteristic of hydraulic strut mount 10. As an example, the third stage may range from approximately 2.5 mm to approximately 7 mm, and generally corresponds to line segment 114 shown in FIG. 7. As illustrated in FIG. 8, upper travel limiter 98 contacts upper secondary bumpstop 70 at the end of the third stage, and further downward axial deflection is generally characterized by a non-linear rate progression having a relatively steep slope and generally corresponding to line segment 116 shown in FIG. 7.

Although, in the above-described exemplary embodiment, the strut mount included an inner hydraulic module disposed within an outer elastomeric module, this need not always be the case. In further embodiments, the unique, multi-stage axial-load deflection profile of the strut mount can be achieved utilizing other combination of elastomeric and/or hydraulic modules, providing that the strut mount includes: (i) an outer module having a first axial stiffness, (ii) an inner module mounted in the outer module and having a second axial stiffness less than the first axial stiffness, and (iii) a travel limiter fixedly coupled to the inner module and normally offset from the outer module by an axial gap. In such embodiments, the travel limiter may be configured to engage the outer module after a predetermined axial displacement of the strut mount to limit the axial range of motion of the inner module and thereby impart the strut mount with a quasi-static axial load-displacement profile at least partially characterized by a piecewise function, such as the piecewise function described above in conjunction with FIG. 7.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A dual path hydraulic strut mount, comprising:
an outer elastomeric module;
an inner hydraulic module mounted in the outer elastomeric module, the inner hydraulic module configured to operate in an active damping mode for axial displacements of the dual path hydraulic strut mount less than a threshold value and in a substantially inactive damping mode for axial displacements of the dual path hydraulic strut mount greater than the threshold value; and
a travel limiter fixedly coupled to the inner hydraulic module and configured to move in conjunction therewith, the travel limiter contacting the outer elastomeric module when the axial displacement of the dual path hydraulic strut mount in a first direction exceeds the threshold value to impede further axial movement of the inner hydraulic module in the first direction, while permitting substantially unimpeded axial deflection of the outer elastomeric module.

2. The dual path hydraulic strut mount according to claim 1 wherein the threshold value is between approximately 1 millimeter and approximately 4 millimeters.

3. The dual path hydraulic strut mount according to claim 1 wherein an axial load-displacement profile of the dual path hydraulic strut mount is generally characterized by a piecewise function over a predetermined axial displacement range.

4. The dual path hydraulic strut mount according to claim 3 wherein the piecewise function comprises:
a first substantially linear segment; and
additional segments subsequent to the first substantially linear segment, the slope of each of the additional segments greater than the slope of the first substantially linear segment.

5. The dual path hydraulic strut mount according to claim 4 wherein the slope of the first substantially linear segment is predominately determined by the axial stiffness of the inner hydraulic module.

6. The dual path hydraulic strut mount according to claim 5 wherein the slope of the additional segments is predominately determined by the axial stiffness of the outer elastomeric module.

7. The dual path hydraulic strut mount according to claim 1 wherein axial displacement of the dual path hydraulic strut mount is primarily constituted by: (i) deflection of the inner hydraulic module for axial displacements of the dual path hydraulic strut mount less than the threshold value, and (ii) deflection of the outer elastomeric module for axial displacements of the dual path hydraulic strut mount greater than the threshold value.

8. The dual path hydraulic strut mount according to claim 1 wherein the axial stiffness of the inner hydraulic module, when in the active damping mode, is less than the axial stiffness of the outer elastomeric module.

9. The dual path hydraulic strut mount according to claim 1 wherein the inner hydraulic module comprises a hydraulic piston configured to translate relative to the outer elastomeric module when the inner hydraulic module is in the active damping mode.

10. The dual path hydraulic strut mount according to claim 9 wherein the travel limiter is fixedly coupled to the hydraulic piston and configured to move in conjunction therewith.

11. The dual path hydraulic strut mount according to claim 10 further comprising a bumpstop separated from the travel limiter by an axial gap when the dual path hydraulic strut mount resides in a first position.

12. The dual path hydraulic strut mount according to claim 11 wherein the travel limiter engages the bumpstop when axial displacement of the dual path hydraulic strut mount from the first position is substantially equivalent to the threshold value.

13. The dual path hydraulic strut mount according to claim 11 wherein the outer elastomeric module further comprises:
an outer insert;
an intermediate insert; and
a main elastomeric element disposed between the outer insert and intermediate insert and having a central opening in which the inner hydraulic module is contained.

14. The dual path hydraulic strut mount according to claim 13 wherein the bumpstop extends axially from the main elastomeric element proximate the inner hydraulic module.

15. The dual path hydraulic strut mount according to claim 13 wherein the inner hydraulic module further comprises:
- an inner cylinder disposed within the central opening and coupled to the piston; and
- first and second diaphragm assemblies extending from the inner cylinder toward the intermediate insert of the outer elastomeric module, the first and second diaphragm assemblies configured to flex to accommodate axial translational movement of the inner cylinder.

16. The dual path hydraulic strut mount according to claim 15 further comprising:
- first and second fluidly-coupled hydraulic chambers within the inner hydraulic module; and
- an elastomeric bushing extending from the intermediate insert toward the inner cylinder and generally partitioning the first and second fluidly-coupled hydraulic chambers.

17. The dual path hydraulic strut mount according to claim 16 wherein the first and second fluidly-coupled hydraulic chambers are fluidly coupled by an orifice, an inertia track, or a combination thereof.

18. The dual path hydraulic strut mount according to claim 13 wherein the bumpstop overlays the intermediate insert.

19. A vehicular suspension system for use onboard a vehicle having a vehicle body, the vehicular suspension system comprising:
- a strut assembly; and
- a dual path hydraulic strut mount, comprising:
  - an outer elastomeric module configured to be mounted to the vehicle body and including a plurality of progressive loading features;
  - an inner hydraulic module mounted in the outer elastomeric module and coupled to the strut assembly; and
  - a travel limiter fixedly coupled to the inner hydraulic module and configured to move in conjunction therewith, the travel limiter contacting at least a first of the plurality of progressive loading features to impede axial displacement of the inner hydraulic module for axial displacements of the dual path hydraulic strut mount exceeding a first threshold value and further contacting at least a second of the plurality of progressive loading features to impede the axial deflection of the outer elastomeric module for axial displacements of the dual path hydraulic strut mount exceeding a second threshold value greater than the first threshold value.

* * * * *